Patented Apr. 10, 1923.

1,450,984

UNITED STATES PATENT OFFICE.

HOWARD W. MATHESON, OF MONTREAL, QUEBEC, CANADA, ASSIGNOR TO CANADIAN ELECTRO PRODUCTS COMPANY, LIMITED, OF MONTREAL, QUEBEC, CANADA.

PROCESS OF MAKING CONDENSATION PRODUCTS OF ALIPHATIC ALDEHYDES.

No Drawing. Application filed February 7, 1921. Serial No. 443,230.

*To all whom it may concern:*

Be it known that I, HOWARD W. MATHESON, a subject of the King of Great Britain, and resident of the city of Montreal, in the Province of Quebec and Dominion of Canada, have invented certain new and useful Improvements in Processes of Making Condensation Products of Aliphatic Aldehydes, of which the following is a full, clear, and exact description.

This invention relates to improvements in a process of producing condensation products or organic compounds of different kinds and is particularly applicable to the production of condensation products of aliphatic aldehydes.

The invention relates more particularly to the production of condensation products of acetaldehyde and especially to the production of acetaldol and higher condensation products of the aldehydes, in which more than two molecules are combined.

The condensation of acetaldehyde to acetaldol takes place according to the equation;—

$$CH_3.CHO + CH_3.CHO = CH_3.CHOH.CH_2.CHO$$

Acetaldehyde may also condense to form aldols of higher molecular weight according to the equation;—

$$3CH_3.CHO = CH_3.CHOH.CH_2.CHOH.CH_2.CHO$$

For a considerable time, such condensation products have been obtained by the use of different agents, such as aqueous solutions of carbonates, cyanides or sulphites. The use of these substances is attended with the marked disadvantage that the reaction is slow and furthermore that it is difficult to separate the product from the large amount of water that must be used as a reagent. In U. S. Patent No. 1,151,113, dated August 24th, 1915, these difficulties are largely eliminated by the use of alcoholic solutions of alkalies. This method has been found to give quite satisfactory results.

According to the present invention, the desired condensation products are produced by the use of solutions of a caustic alkali and temperature control. According to pre-conceived ideas on the subject, the use of non-aqueous solutions of caustic alkalies was essential to the success of the process, but it has been found that solvents for the caustic alkali which are wholly or partly aqueous will give equally good results under proper conditions. The invention therefore resides partly in the use of caustic alkali solvents wholly or partly aqueous and partly in the manner of handling the solutions.

According to the present invention, solutions of a caustic alkali are used in small quantity and the reaction carefully controlled to keep the temperature below approximately 20° C. for operations at atmospheric pressure. The solvent is preferably but not necessarily aqueous-alcoholic or entirely aqueous. By "aqueous-alcoholic" is meant a solution containing more than 5% of water. When using even an entirely aqueous solvent only a very small amount of water is introduced into the reaction product due to the small amount of reagent added. The amount of water is for most purposes not detrimental to the quality of the product and purification is often unnecessary. The amount of alkali used depends upon the particular aldehyde to be condensed and also to a slight extent upon the solvent, so that the maximum amount is difficult to determine but will be under 10% of the weight of the aldehyde. It is furthermore found that by the use of the reagents as above outlined, pure aldols may be readily obtained or, if desired, higher condensation products of the aliphatic aldehydes in which three or more molecules are combined.

As an illustration of the invention, the following examples are cited;—

*Example 1.*—200 grams of freshly distilled acetaldehyde is cooled to a temperature substantially not below —25° C. and substantially not above 20°. 11.3 cc. of a 10% solution of caustic soda in which the solvent is ethyl alcohol and water in equal parts is slowly added with vigorous stirring and cooling to keep the temperature of reaction below 20° C. The product is then kept below 20° C. and preferably between 0° and 15° C. for from twelve to twenty-four hours. At the end of this time the alkali present is neutralized with any suitable acid and the resulting salt filtered from the aldol. The product consists of pure acetaldol mixed with a small amount of acetaldehyde, alcohol and water, from which it can be subsequently separated by distilling off the aldehyde and alcohol. The amount of water is so small that its presence is not detrimental for all ordinary purposes. In neutralizing the alkali, an acid such as sulphuric may be used but great care must be taken to use not more than substantially the molecular equivalent of the alkali, as otherwise undesirable products, such as crotonaldehyde, are formed on heating of the product. Sulphuric acid is a satisfactory neutralizing agent, for the reason that the resulting salt is substantially insoluble in the aldol and may be readily separated by filtration.

*Example 2.*—The process of Example 1 is followed out except that the alkali solvent is entirely water. The initial reaction is much more vigorous and the material must be efficiently cooled in order to prevent resinification. The reaction, if maintained below 10° C., shows no signs of resin formation. The temperature may be allowed to rise above 10° or even as high as 20° C. for short periods of time during the reaction and still give good results. As previously stated, the reaction is more vigorous than when an aqueous-alcoholic solution is used and about thirty minutes after the reagent is added, the material is a thick colorless product. The material is allowed to stand for a number of hours, preferably between 0° and 10° C. and the alkali is then neutralized and the product treated as in the previous example.

*Example 3.*—Aldols of higher molecular weight may be obtained by proceeding as in either of the foregoing examples and using a slightly increased amount of alkali, the product being a mixture of aldol with bodies being three, four or more molecule condensation compounds of aldehyde. The higher condensation products may be separated from aldol by distilling off the aldol in vacuo.

While in the foregoing examples, ethyl alcohol and caustic soda have been mentioned, it will be understood that the invention is not limited to this, as other alcohols non-alcoholic and non-aqueous solvents may be used in place of ethyl alcohol and water; also caustic potash or a mixture of caustic potash and caustic soda may be used in place of caustic soda. It will also be understood that the invention is not limited to acetaldehyde, but may be carried out with slight modifications with other aliphatic aldehydes.

The upper temperature limit of 20° has been previously stated to apply to operations at atmospheric pressure, which is the preferable condition. The process may be carried out at pressures above atmospheric, which would permit the use of higher temperatures without boiling the aldehyde but, at the higher pressures and temperatures or at higher pressures alone, undesirable products may be expected. If the process is carried out at pressures below atmospheric, the upper temperature limit will be necessarily reduced proportional to the pressure. It will therefore be understood that the temperature limitations have reference only to operations at atmospheric pressure and must be held to include the corresponding temperatures for higher or lower pressures.

In the following claims it must be understood that the term "aqueous solvent" includes any solvent containing 5% or more of water and therefore includes solvents which are aqueous-alcoholic, entirely aqueous or combinations of water and some non-alcoholic solvent.

Having thus described my invention, what I claim is:—

1. A process of making condensation products of aliphatic aldehydes, which comprises adding to an aldehyde under 10% of its weight of a caustic alkali in aqueous solution.

2. A process of making condensation products of aliphatic aldehydes, which comprises adding to an aldehyde under 10% of its weight of caustic alkali solution, the solvent of said solution containing 5% or over water and an alcohol.

3. A process of making condensation products of aliphatic aldehydes, which comprises slowly adding to an aldehyde under 10% of its weight of a caustic alkali in aqueous solution and maintaining the temperature of reaction below 20° C.

4. A process of making condensation products of aliphatic aldehydes, which comprises cooling an aldehyde to a temperature between —25° and 20° C., adding slowly under 10% of its weight of a caustic alkali in aqueous solution, while vigorously stirring and cooling the mixture to maintain a temperature below 20° C.

5. A process of making condensation products of aliphatic aldehydes, which comprises adding to an aldehyde under 10% of its weight of a caustic alkali in aqueous solution, maintaining a temperature below 20° C. during the addition of the alkali and for a period of twelve to twenty-four hours thereafter, neutralizing the alkali, and separating the condensation product from unchanged aldehyde by distillation.

6. A process of making condensation products of aliphatic aldehydes, which comprises adding to an aldehyde an aqueous solution of caustic alkali, vigorously stirring the mixture during addition of the alkali, and maintaining a temperature below 20° C. during the addition of the alkali and for a period of twelve to twenty-four hours thereafter, neutralizing the alkali and separating the formed salt and any uncondensed aldehyde from the condensation product.

7. A process according to claim 6, in which the solvent contains alcohol.

8. A process of making a condensation product of acetaldehyde, which comprises adding to the aldehyde approximately 0.5% by weight of caustic alkali in aqueous solution.

9. A process of making a condensation product of acetaldehyde, which comprises adding to the aldehyde approximately 0.5% by weight of caustic alkali in aqueous-alcoholic solution.

10. A process of making a condensation product of acetaldehyde, which comprises slowly adding to the aldehyde a 10% aqueous solution of a caustic alkali, containing alkali in amount equal to approximately 0.5% of the weight of the aldehyde, maintaining a temperature below 20° C during the addition of the alkali and for twelve to twenty-four hours thereafter, and neutralizing the alkali, and separating the resulting salt and unchanged aldehyde from the condensation product.

11. A process according to claim 10, in which the alkali solvent is aqueous-alcoholic.

12. A process according to claim 10, in which the aldehyde is first cooled to a temperature of below 20° C. and then vigorously stirred during addition of the alkali.

In witness whereof, I have hereunto set my hand.

HOWARD W. MATHESON.